W. H. GLENN.
VALVE.
APPLICATION FILED DEC. 20, 1909.
977,614.
Patented Dec. 6, 1910.
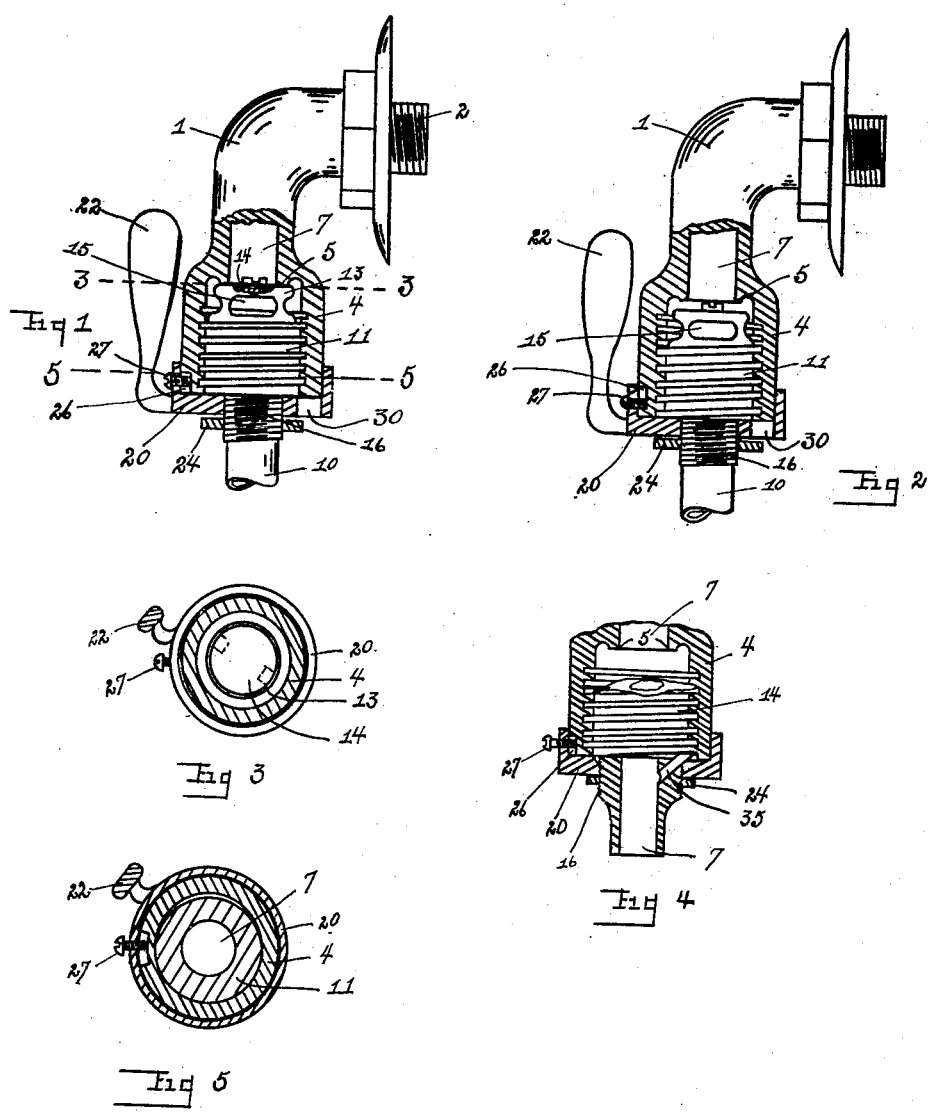
WITNESSES:
INVENTOR
WILLIAM H GLENN
BY
ATTORNEYS

UNITED STATES PATENT OFFICE.

WILLIAM H. GLENN, OF HEMPSTEAD, NEW YORK.

VALVE.

977,614.  Specification of Letters Patent.  Patented Dec. 6, 1910.

Application filed December 20, 1909. Serial No. 534,009.

*To all whom it may concern:*

Be it known that I, WILLIAM H. GLENN, a citizen of the United States, residing at Hempstead, in the county of Nassau and State of New York, have invented certain new and useful Improvements in Valves, of which the following is a specification, reference being had therein to the accompanying drawing.

My invention relates to an improved valve, and I declare that the following is a full, clear, concise and exact description thereof, sufficient to enable one skilled in the art to make and use the same, reference being had to the accompanying drawings, in which like reference characters refer to like parts throughout.

The invention is shown in one style of valve, though it has various possible applications, in which a valve stem is operative, by longitudinal movement, to close or open a valve. The reciprocating motion of the stem is given by rotating it and the stem is hollow to form a water passage.

In the drawings Figure 1 is a side view of the device, parts shown in vertical section, parts broken away and the valve closed. Fig. 2 is a side view with the valve open. Fig. 3 is a down view in transverse section on line 3—3 of Fig. 1. Fig. 4 shows a form modified in one particular. Fig. 5 is a cross-sectional view on line 5—5 of Fig. 1.

Referring to the figures in detail, 1 represents a casing of such form, style and material as is suitable for the use proposed, and having the usual mounting member, such as screw end 2. At the outlet end the casing is enlarged in the head 4 at the inner end of which is a valve-seat 5 formed at the orifice of passage or duct 7. The head 4 is interiorly threaded with long-spiral threads.

The valve-stem 10 is essentially a headed tube. It has an exteriorly threaded part 11 to fit into the head 4. It has a head 13 with washer 14 adapted on rotation of the stem to close the valve by the abutting of the head and washer against the valve-seat 5. The portion 11 does not extend to the head but a space is left between the two parts and in that portion the wall of the tube forming the stem is cut away at one or more places to provide a passage for the outflow from the orifice of pipe 7 into and through the pipe 10, one of the openings being shown at 15. At the opposite end of the part 11 the stem is exteriorly threaded, as at 16, to provide for the mounting thereon of the lever 20 which has an interiorly threaded portion therefor, and a handle of suitable form and material shown at 22 and integral therewith or suitably connected thereto. The lever is secured in place when mounted on the stem as by lock-nut 24. A small turn of the lever, such as a quarter, opens the valve. At 26 the head is recessed to receive screw 27 mounted in the lever to limit the movement of the latter, this form being representative of any suitable means of limiting the movement of the lever. As slight leakage may occur when the valve is open, between the stem and the head where they are threaded in each other, and this leakage settles into the lever, an outlet 30 is provided for its escape. It may be preferred to pass this leakage into the stem duct and to that end I provide a duct or ducts, 35 cut through the wall of the stem, preferably obliquely and downward from about the bottom of the screw threaded portion of the stem, as indicated in Fig. 4.

I am aware that attempts have been made to devise an efficient and economical valve of this design, but such as have been produced are found to be impractical and expensive. As distinguished from such, whose defects are readily noted, I have invented a valve which is of few, simple and inexpensive parts, easily assembled, having little or no valve wear and thoroughly practical and efficient.

Having described my invention, what I claim as new and desire to secure by Letters Patent, is:

1. In a device of the character described, the combination of a valve casing having a recess therein and having a headed portion with threads adapted to mount a valve stem, a valve stem having a head with a washer, a lever screw mounted on said valve-stem and locked thereon, a handle to turn said lever, a screw mounted in said lever adapted to engage the end walls of said recess in said valve-casing whereby to limit the rotation of said lever, and a duct in said valve-stem whereby to drain the leakage between said valve-casing and said valve-stem, substantially as described.

2. In a device of the character described, the combination of a valve-casing having a recess therein and having a headed portion adapted to form a seat, said headed portion being internally screw threaded and adapted to mount a valve-stem, a valve stem having a duct to drain the leakage between said valve-casing and said valve-stem, a lever screw mounted on said valve-stem, a screw mounted in said lever adapted to engage said recess in said valve-casing, whereby to limit the rotation of said lever, a nut adapted to lock said lever on said valve stem and a handle to rotate said lever within the limits allowed by said screw, substantially as described.

In testimony whereof I hereunto affix my signature in the presence of two witnesses.

WM. H. GLENN.

Witnesses:
RICHARD MATTHEWS,
SHERMAN SEAMAN.